J. D. MADDUX.
PLANTER.
APPLICATION FILED JULY 25, 1913.
1,089,657.
Patented Mar. 10, 1914.
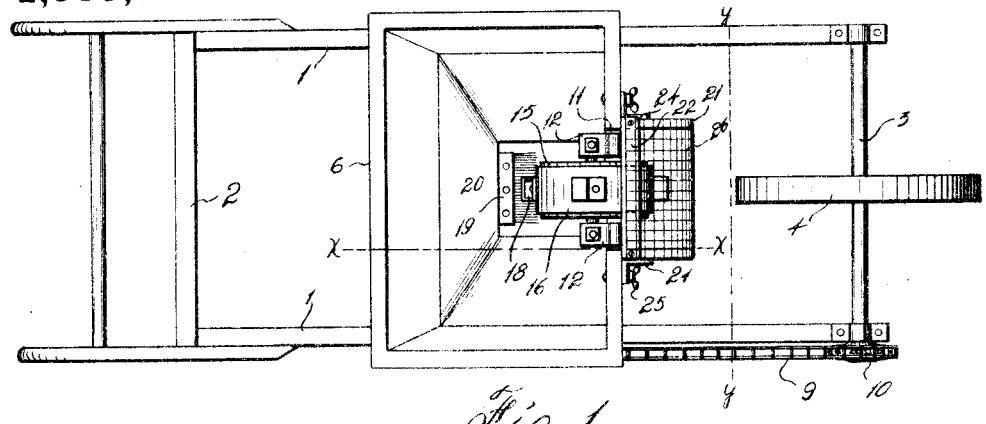
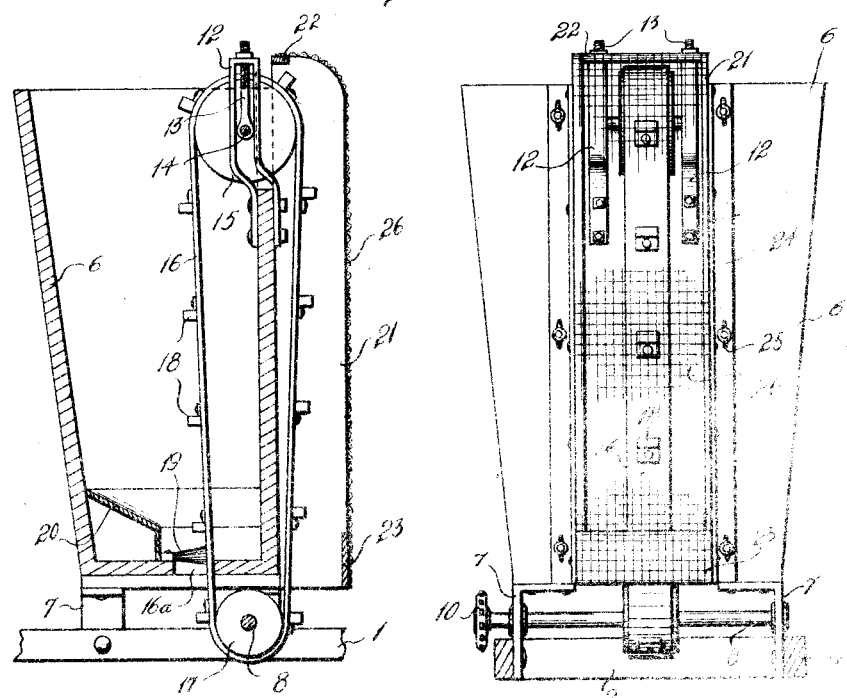
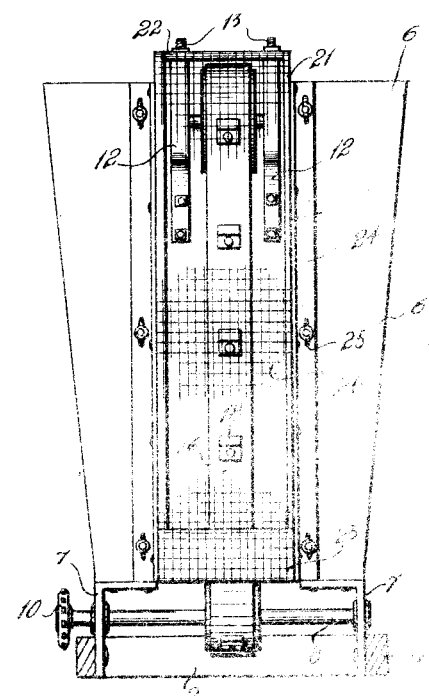
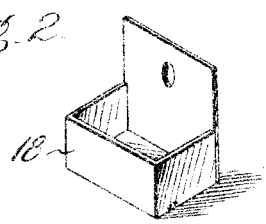

UNITED STATES PATENT OFFICE.

JESSE D. MADDUX, OF ATWELL, TEXAS, ASSIGNOR OF ONE-HALF TO JOHN A. LAUDERDALE, OF HARPERSVILLE, TEXAS.

PLANTER.

1,089,657.   Specification of Letters Patent.   Patented Mar. 10, 1914.

Application filed July 25, 1913. Serial No. 781,088.

*To all whom it may concern:*

Be it known that I, JESSE D. MADDUX, a citizen of the United States, residing at Atwell, in the county of Callahan and State of Texas, have invented certain new and useful Improvements in Planters, of which the following is a specification.

My invention relates to a new and useful planter, particularly adapted to plant peanuts but also applicable for use in planting various other kinds of seeds.

The object of the invention is to provide a planter so constructed and operated that the seed will be discharged from the top of the seed hopper rather than from the hopper bottom as is usually the case, this construction making it possible for the person operating the planter to observe the seeds as they are being discharged, thus giving him definite knowledge as to whether or not the machine is operating as it should.

Still another object of the invention is to provide a planter that may be readily adapted to drop any desired number of seeds in a hill, ranging from one up.

A further object is to provide a planter that may be adapted to drop the seeds at any desired distance apart, and which will discharge the seeds in such a manner as to positively avoid injuring the same.

A still further object of the invention is to provide a device of the character described that will be strong, durable, simple and efficient and comparatively inexpensive to produce, also one in which the several parts will not be likely to get out of working order.

With the above and other objects in view, the invention has relation to certain novel features of construction and operation, an example of which is described in the following specification and illustrated in the accompanying drawing, wherein:

Figure 1 is a plan view of my planter. Fig. 2 is a view showing the hopper and seed discharge mechanism in sectional elevation, the section being taken upon the line X—X of Fig. 1. Fig. 3 is a sectional view taken upon the line Y—Y of Fig. 1 and showing the hopper in front elevation. Fig. 4 is a perspective view of a seed cell.

Referring now more particularly to the drawing, wherein like reference characters designate similar parts in all the figures, the numeral 1 denotes the side bars of the planter frame, which bars are rigidly connected at their rear extremities by a crosspiece 2. Upon the forward extremities of the bars 1 are supported the ends of an axle 3 carrying at its center a transporting wheel 4. Upon the center portion of the frame comprised by the members 1 and 2, there is rigidly mounted a seed hopper 6 which rests upon a pair of angular brackets 7 respectively secured to the bars 1. The hopper 6 and the bar 2 in conjunction establish a rigid relation between the parallel side bars 1. The hopper 6 will preferably have its side and rear walls inclined slightly inward from top to bottom. Beneath the forward portion of the hopper 6, there is rotatably mounted a shaft 8 having its extremities journaled in the brackets 7. Rotation is communicated to the shaft 8 from the axle 3 by a chain 9 engaging a pair of sprocket wheels 10. At its top, the front wall of the hopper 6 is formed with an aperture 11 centrally disposed. Within said aperture, there are mounted two spaced centrally apertured brackets 12, the central apertures of which receive inverted eye-bolts 13, screw threaded at their upper ends in the tops of said brackets. The lower extremities of the eye-bolts 13 form bearings for a shaft 14 parallel to the shaft 8, and carrying a pulley 15 between the two brackets.

Between the pulley 15 and a pulley 17 centrally mounted upon the shaft 8, there is extended an endless belt 16, which belt is adapted to travel upwardly within the hopper 6 and downwardly in front of said hopper. Upon the outer face of said belt, there is secured a plurality of seed cells 18 disposed at equal spaced intervals, each cell as it travels upwardly through the hopper being adapted to receive one or more seeds according to the size of the cell and the nature of the seeds, and as each cell during the travel of the belt is carried over the upper pulley 15, it will assume an inverted position and will discharge its contents. The seed therefore will fall to the ground from a point just in front of the upper pulley 15. To permit the belt 16 and the seed cells carried by said belt to enter the hopper, an aperture 16ª is formed in the hopper bottom, which aperture is normally closed by a plurality of bristles 19 fastened at one end upon an edge of the aperture 16ª and brushing at their free ends against the face of the belt 16. These bristles will yield upwardly as each seed cell passes through the aperture 16ª but will immediately close said aperture after a seed cell has entered the hopper. A metallic false bottom 20 will preferably rest upon the true bottom of the hopper, so that when only a small quantity of seed remains in the hopper, it will be deflected by the inclined surface of said false bottom to a position where it may enter the seed cells as they are carried upwardly into the hopper.

A description will now be given of a screened casing which may be mounted upon the front wall of the hopper to inclose the downwardly traveling portion of the belt 16, and to keep any wind from reaching the seeds and preventing the same from falling in a vertical line. This casing comprises side-boards 21 rigidly connected at the upper and lower ends by cross-pieces 22 and 23, said boards being secured to the front wall of the casing at each side of the belt by angle-bars 24 having a fixed connection with the boards 21 of any suitable sort, and having a connection with the hopper such as will permit the casing to be readily removed, this connection being preferably established by bolt and wing nut as indicated at 25. Between the outer edges of the boards 21, there is stretched a wire screen 26 which will preferably curve rearwardly at its upper end so as to partially house the upper pulley 15. The above described casing serves not only to protect the falling seeds from the wind but also guards the downwardly traveling portion of the belt preventing anything from coming into contact with the same.

It is to be observed that the bearings provided for the shaft 14 are such that said shaft may be subjected readily to a slight vertical displacement so as to regulate the tension of the belt 16.

In using my invention as a peanut planter for which purpose it is especially adapted, the cells 18 will be so proportioned that each cell may hold one peanut. The distance between the points at which the seeds are dropped will be dependent upon the spacing of the cells 18 upon the belt 16 and will also depend upon the speed at which said belt is driven.

It is apparent that the seeds cannot be crushed or in any way injured when being discharged from a hopper by the above described mechanism. Furthermore the seeds as they are carried from the hopper are plainly visible to the operator, and there will never be any uncertainty as to whether or not the mechanism is operating properly.

The invention is presented as including all such modifications and changes as properly come within the scope of the following claims:

What I claim is:

1. In a seed planter the combination with a wheel supported frame, of a hopper mounted on the frame, an endless belt having legs traveling vertically on each side of one of the walls of the hopper, buckets mounted on the belt, a false bottom removably disposed on the bottom of the hopper and having portions inclined downward toward the belt, and a brush mounted on the bottom of the hopper within the false bottom and contacting with the belt.

2. In seed planter the combination with a wheel supported frame, of a hopper mounted on the frame, an endless belt having legs traveling vertically on each side of one of the walls of the hopper, buckets mounted on the belt, a belt casing comprising connected side boards extending from the bottom to the top of the hopper on the outside thereof, a covering of wire fabric secured on the side boards of the casing and extending the entire length of the casing whereby one entire leg of the belt is visible, angular flanges secured to the side boards of the casing, and means for removably fastening the flanges to the hopper wall.

In testimony whereof I have signed my name to this specification in the presence of two subscribing witnesses.

JESSE D. MADDUX.

Witnesses:
L. W. REID,
J. E. ANDREWS.